United States Patent [19]

Stumpf

[11] Patent Number: 4,895,352

[45] Date of Patent: Jan. 23, 1990

[54] MATTRESS OR CUSHION SPRING ARRAY

[75] Inventor: Walter Stumpf, Dunwoody, Ga.

[73] Assignee: Simmons Company, Atlanta, Ga.

[21] Appl. No.: 295,063

[22] Filed: Jan. 9, 1989

[51] Int. Cl.$^4$ ............................ F16F 3/00; F16F 5/00; A47K 11/04; B29C 43/22

[52] U.S. Cl. .......................................... 267/80; 5/246; 5/476; 264/506; 267/122

[58] Field of Search ................. 267/80, 117, 122, 292, 267/131, 152, 153, 141.6, 143, 145; 5/246, 450, 455, 449, 476, 477, 461, 258; 264/506, 507; 156/245, 285, 165; 297/DIG. 2, DIG. 3, DIG. 8; 188/372, 377

[56] References Cited

U.S. PATENT DOCUMENTS

| | | |
|---|---|---|
| 2,433,012 | 12/1947 | Zalicovitz . |
| 2,434,641 | 1/1948 | Burns ................................. 5/455 X |
| 3,251,077 | 5/1966 | Beckman ................................ 5/476 |
| 3,263,247 | 8/1966 | Knittel et al. .................... 267/117 X |
| 3,633,228 | 1/1972 | Zysman ................................ 5/477 |
| 3,638,254 | 2/1972 | Falkenau ............................. 5/351 |
| 3,815,887 | 6/1974 | Curtis et al. ......................... 267/91 |
| 3,879,776 | 4/1975 | Solen ....................... 297/DIG. 2 X |

FOREIGN PATENT DOCUMENTS

| | | | |
|---|---|---|---|
| 1148718 | 5/1963 | Fed. Rep. of Germany ...... | 267/122 |
| 2153577 | 5/1973 | Fed. Rep. of Germany ...... | 264/506 |
| 1406944 | 6/1965 | France ................................. | 5/455 |

Primary Examiner—Robert J. Oberleitner
Attorney, Agent, or Firm—Jones, Askew & Lunsford

[57] ABSTRACT

An improved array of spring units. In a preferred embodiment, the spring units are composed of polyurethane which are blow molded such that a string of bellows-like springs are provided, with the axial ends of each spring being free for axial compression, while the sides of the springs are left attached to each other during the blow molding process. In another embodiment, the blow molded springs each include a vent hole which affects the dynamic cushioning properties of the springs. In another embodiment, extruded tubes of particular configurations are slotted at spaced-apart intervals such that independent spring units are provided, with the axial ends of each spring being free for axial compression. The array of spring units does not require a fabric covering as do strings of pocketed coils, but may be as easily handled, and may be connected in side-to-side abutting relationship to provide a mattress, cushion, or box spring inner construction.

7 Claims, 2 Drawing Sheets

MATTRESS OR CUSHION SPRING ARRAY

TECHNICAL FIELD

The present invention generally relates to spring assemblies for mattresses, cushions, and the like, and more particularly to a connected series, row, or array of springs for mattresses and cushions.

BACKGROUND OF THE INVENTION

In mattress and cushion construction, a need has been recognized for mattresses or cushions which provide comfortable and durable supporting surfaces, but are also cost-effective to produce.

A variety of configurations have been used to provide such optimum sleeping surfaces. Some mattress configurations have included types of foam rubber to provide a cushioning effect to support the human body. Other configurations have utilized a plurality of spaced-apart coil springs, which, depending on the user, provide support preferred to that provided by foam rubber only.

Spring Assemblies

One example of such a spaced-apart coil spring assembly is U.S. Pat. No. 4,051,567 to Hutchinson, which discloses a coil spring assembly including aligned rows of coil springs connected together within each row and between rows, and also includes additional reinforcing springs which are interspersed about the periphery of the spring assembly, with all springs being held in place by border helical and helical tie wires. Although such mattress configurations are effective, disadvantages are apparent in that such linked configurations do not allow for independent action of the springs, thus preventing the mattress from conforming accurately to the user's body.

Pocketed Coil Springs

It has also been known to provide springs in a preloaded state, prior to assembly of the springs into a mattress or cushion construction. The preloaded configuration of the springs provides a supporting structure that is sufficiently yielding to be comfortable but does not deflect excessively as would a cushion or other structure composed of similarly configured but non-preloaded springs.

One example of such construction is in U.S. Pat. No. 1,466,617 to Foster, entitled "COVERED SPRING STRUCTURE", discloses a tubular covering formed on flexible material such as cotton cloth or the like, provided by bringing opposite edges of a long strip of cloth together and sewing through both layers of cloth near the adjacent edges by a row of stitches. The covered springs are assembled side-by-side and then fastened by fastening means such as U-shaped metal clips. The feature of having the springs held under partial compression provides a structure that is sufficiently yielding to be comfortable but without the great extent of sag or give before the person is sustained that is present in a cushion or other structure composed of equally soft or resilient springs. Pocketed Coil Springs In order to provide improved handling characteristics, it has been known to provide "strings" of pocketed coil springs, wherein the springs are encapsulated in a preloaded state within pockets formed in an elongate strip of fabric, the axes of the springs being generally parallel to each other. For purposes of this application such configurations will be referred to as "pocketed coil strings". It should also be understood that the terms "coil", "spring", or coil spring are interchangeable for purposes of this discussion.

In my U.S. Pat. No. 4,439,977, entitled "METHOD AND APPARATUS FOR MAKING A SERIES OF POCKETED COIL SPRINGS", a method and apparatus are disclosed for making coil springs pocketed within individual pockets in an elongate fabric strip comprised of two overlaying plies capable of being thermally welded together. The fabric strip is fed along a guide path during which compressed springs are inserted between the plies with the axes of the springs substantially normal to the planes of the plies, whereafter the fabric plies are thermally welded together longitudinally and transversely to form a string of pocketed coils. After thermal welding, the pocketed coils are passed through a turner assembly during which the springs are reoriented within the fabric pockets to positions wherein the axes of the springs are transverse to the fabric strip. Although this method of manufacture has several advantages, one disadvantage is that, during the turning process, the springs may tend to become "hooked" on themselves, and do not extent to their proper positions. Therefore, additional and costly labor is required to orient the "hooked" springs to their desired configurations. Even if the springs do not become hooked, difficulties may still arise in correctly aligning them to their desired positions, with the longitudinal axes of the springs being substantially parallel. Assemblies of Strings of Pocketed Coils As previously discussed, pocketed coil strings may be readily assembled into mattress or cushion assemblies. An example of the use of such strings is shown in my U.S. Pat. Nos. 4,234,984, entitled "POCKETED SPRING ASSEMBLY" and 4,401,501, entitled "APPARATUS FOR MAKING ASSEMBLIES OF POCKETED SPRINGS" in which strips of pocketed upholstery springs are assembled, one strip at a time, into mattresses and the like. The connections of each such strip to its predecessor are made between the interpocket webs of the pocket sheeting of the two adjacent strips, preferably at intervals of two springs, and are staggered by one spring from strip to strip. The disclosed and preferred technique for joining the pocket material of the adjacent strips is thermally welding by ultrasonic vibration, but other specific forms of connection are also suggested.

In my U.S. Pat. No. 4,451,946, entitled "POCKETED SPRING ASSEMBLY", an improvement of my U.S. Pat. No. 4,234,984 is discussed. The improvement includes an elongated connection which connects the pocket sheeting of adjacent strips together between adjacent springs of a strip, with the firmness of the assembly thus being increased by the nature of the elongated interstrip connection.

In my U.S. Pat. No. 4,523,344, entitled "INDEPENDENT BLOCK ASSEMBLY OF SPRINGS", a spring assembly is disclosed which includes a plurality of interconnected longitudinal blocks of pocketed coil springs. each block includes a pair of interconnected strips of pocketed springs which are preferably arranged in a square array. Each pair of strips is tightly encased by a flexible cover. The covers are connected to each other along longitudinal hinge lines which allows the assembly to bend easily in at least one direction.

In my U.S. Pat. No. 4,578,834, entitled "INNERSPRING CONSTRUCTION", an innerspring construction including adhered strings of pocketed coil springs is disclosed together with a method of manufacture. The strings are connected to each other by an adhesive applied between the lines of tangency of adjacent coil springs. A hot melt adhesive applicator transverses a string of pocketed coils, depositing a precise amount of adhesive on each coil jacket. A second string is positioned on the first, and pressure is applied thereto. The applicator then traverses the second string in the same manner as the first. The sequence is repeated until an innerspring construction of desired size is created. My U.S. Pat. No. 4,566,926, entitled "METHOD AND APPARATUS FOR MANUFACTURING INNERSPRING CONSTRUCTIONS", a continuation in part of U.S. Pat. No. 4,578,834, discloses the method and apparatus for manufacturing the mattress assembly disclosed in U.S. Pat. No. 4,578,834.

In U.S. Pat. No. 4,485,506, in which I was a co-inventor, entitled "COIL SPRING CONSTRUCTION", a coil spring construction is provided for incorporation within a mattress or a cushion. The construction includes a plurality of independently mounted pocketed coil springs. Resilient stabilizers are provided between the springs to maintain their axial positions. The spring pockets are formed by the sealing of first and second sheets to each other in a substantially circular configuration about the longitudinal axis of the spring. Spring height is determined by the inside diameter of the seal. It should be noted that this disclosure notes that one advantage of this method is that the springs may simply be allowed to expand after insertion and do not require turning. As previously discussed, in methods where compressed springs are inserted into folded strips which are then stitched or welded in a rectangular pattern, the springs must be turned after insertion so that their axes are substantially colinear with the longitudinal axes of the resulting pockets. (col. 2, lines 49-60).

Individual Bellowed Coil Constructions

It has also been known to provide coils which, instead of being configured in the previously-discussed coiled configuration, are constructed in a bellowed-type manner. One example of such a configuration is shown in U.S. Pat. No. 2,433,012 to Zalicovitz, entitled "RESILIENT CONSTRUCTION FOR USE IN FUTURE" which illustrates the use of individual juxtaposed units 100, 101, 102, etc (See FIG. 26) assembled together to form a box spring assembly, which may be covered by a cloth layer 105 having folds 106, 107, etc., extending down between the units (see col 6, lines 35-42). The individual units may be composed of a resilient material such as metal, paper, cardboard, or synthetic plastics.

U.S. Pat. No. 3,251,077 to Beckman entitled "SPRING ASSEMBLY" discloses the use of individual bellows-type springs 14 which are intermeshed as shown in FIG. 4, such that an upright bellows intermeshes with adjacently-positioned inverted bellows, providing interaction of the individual bellows.

U.S. Pat No. 3,263,247 to Knittel, et. al., entitled "HEADED HOLLOW BODY SUPPORT" discloses the use of molded spring units 16 each including a head 30 and a plurality of bellows 18. As shown in Figure 2, the spring units may be arranged together without bellows interaction with the heads in side-abutting relationship, or may be arranged as shown in FIG. 4 such that upright and inverted spring units are adjacently positioned and the spring bellows interact.

U.S. Pat. No. 3,638,254 to Falkenau, entitled "SPRING", discloses an individual spring unit 10 which may be positioned alongside similarly-shaped springs to provide a mattress foundation shown in FIGS. 4 and 6. The springs may be made of a "suitable plastic material, preferably polypropylene, or, for example, polyvinyl chloride" (see Col. 2, lines 40-41). As shown in FIG. 7, a cover may be provided over the springs and attached to the frame (see col. 2, lines 54-55).

U.S. Pat. No. 3,815,887 to Curtis, entitled "PLASTIC SPRING", illustrates a particular thin wall, hollow, corrugated spring provided with a plurality of annular peaks, each separated by a respective one of a plurality of annular valleys. Column 1, lines 42-44 indicates that the spring could be used in a sofa construction.

Disadvantages in the Prior Art

Although the above-discussed patents provide configurations which include distinct advantages, it should be understood that some shortcomings do also exist. The configurations which require coil springs to undergo severe axial compression during insertion into fabric pockets possess severe disadvantages as they may allow the springs to become tangled or "hooked" on themselves instead of expanding to their desired position. Therefore additional labor is required to "unhook" the springs to allow them to expand as desired.

The configurations which require turning of coil springs after insertion into the pockets also possess disadvantages in that the springs may not be accurately positioned during the turning process, thus resulting in the assembly of pocketed coil strings which may have springs which are not axially aligned.

Furthermore, it may be seen that pocketed coil springs, when under compression, exert pressure at their axial ends at a relatively concentrated area, that being at the "hoop" at which the coils terminate. It should be understood that this concentrated point of contact results in disadvantages failure at the point at which the coil hoop contacts the surrounding fabric pocket. After failure, the coil may escape from the pocket, not only losing its effectiveness but also presenting possible discomfort to the user.

The configurations illustrating the use of bellows-type springs, although providing advantages, are nevertheless required to be individually placed within a mattress or cushion construction, requiring excessive labor expenditures.

Therefore, it may be seen that a need exists for a spring array which overcomes the disadvantages in the prior art by eliminating any requirements for fabric pockets. Furthermore, it may be seen that a need exists for a spring used within such arrays with increased load bearing surfaces at its axial ends, to reduce the tendency of failure between the coils and the surfaces upon which they bear. Finally, a need has always existed to provide mattress materials which are cost-and-labor effective in that they require a minimum amount of materials and labor.

SUMMARY OF THE INVENTION

The present invention overcomes the above-discussed disadvantages in the prior art by providing a mattress or cushion interior construction which is effective in performance, yet cost-effective in that it requires a minimum amount of materials and labor. Furthermore, the present invention provides a construction which does not include outwardly-protruding seams, as no fabric is required. The unique configuration of the springs allows for each spring to include an end bearing surface which is significantly larger in area than that known in the art, thus reducing the load concentration at the ends of the springs when under compression.

Generally described, the load supporting structure according to the present invention includes a first spring member itself of unitary construction including a first body portion and two opposing end portions, the end portions each defining a substantially planar supporting surface being deflectable relative to the first body portion along a first axis; a second spring member itself of unitary construction including a second body portion and two opposing end portions, the end portions each defining a substantially planar supporting surface being deflectable relative to the second body portion along a second axis; and means for interconnecting the first spring member and the second spring member such that the first axis is substantially parallel to the second axis.

Thus, it is an object of the present invention to provide an improved mattress or cushion spring construction.

It is a further object of the present invention to provide a mattress or cushion spring which is cost-effective.

It is a further object of the present invention to provide a mattress or cushion spring which has a lesser tendency to fail than prior art springs.

It is a further object of the present invention to provide a mattress or cushion spring with improved dynamic loading response.

It is a further object of the present invention to provide an improved method and apparatus for providing mattress or cushion springs.

It is a further object of the present invention to provide mattress or cushion springs which do not require pocket material for enclosing the springs.

It is a further object of the present invention to provide a method of assembling mattresses or cushion springs.

Other objects, features, and advantages of the present invention will become apparent upon reading the following detailed description of the preferred embodiment of the invention when taken in conjunction with the drawings and the appended claims.

DETAILED DESCRIPTION OF THE PREFERRED EMBODIMENTS

Figure 1:
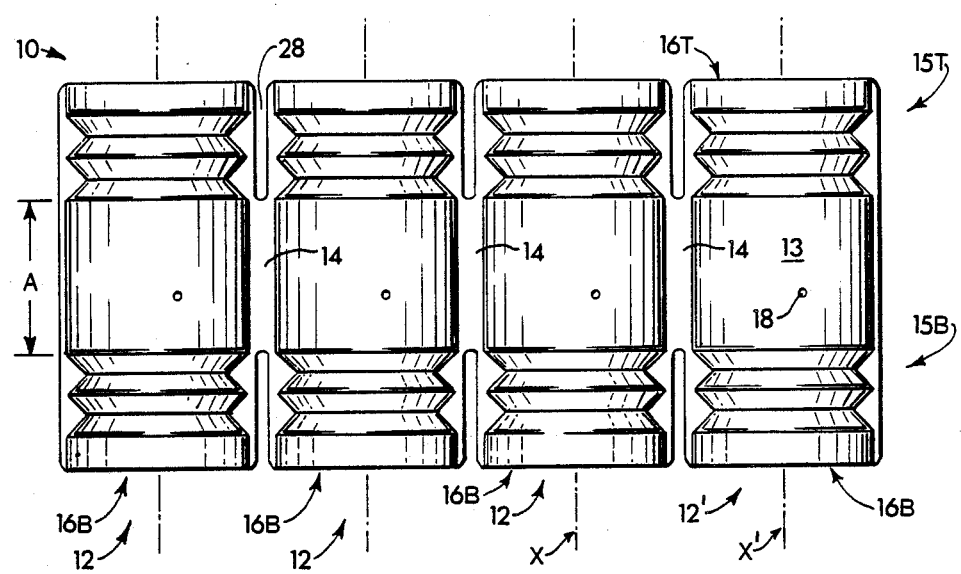
FIG. 1 is a side plan view of a first embodiment of spring arrays of blow molded construction in accordance with the present invention.
Figure 2:
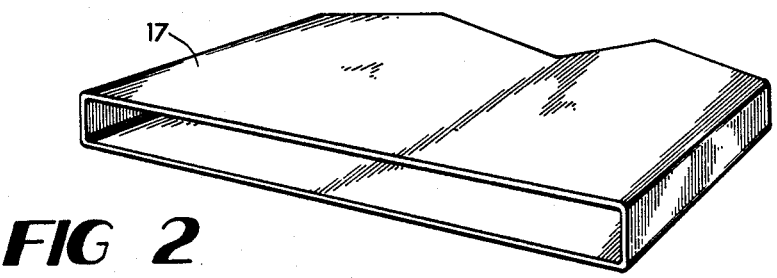
FIG. 2 is an an perspective view of extruded tubing which is fabricated according to the present invention to create the embodiment shown in FIG. 1.
Figure 3:
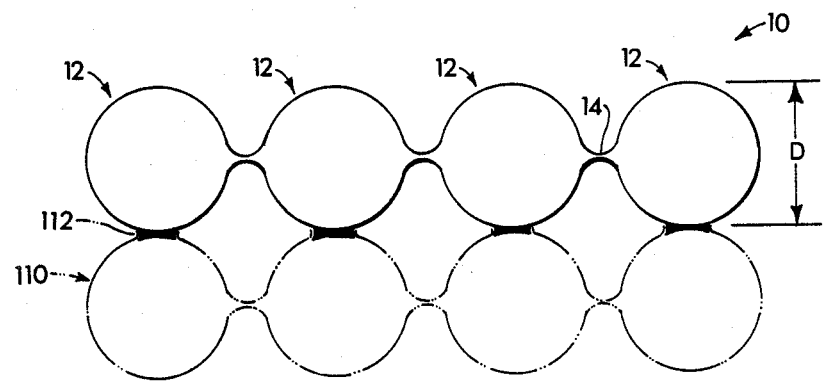
FIG. 3 is an upper or lower plan view of the embodiment shown in FIG. 1, with an adjacently-positioned similar embodiment shown in the phantom.

Referring now to the drawings, in which like numerals represent like parts throughout the several views, FIGS. 1, 2 and 3 illustrate a blow molded spring array configuration 10 according to the present invention, and FIGS. 4–7 illustrate a extruded and slotted spring array configuration according to the present invention.

Blow Molded Configuration

Referring to FIG. 1, a spring array 10 is shown including a plurality of spring units 12, each unit including a body 13, and also including top and bottom deformable ends 15T, 15B, respectively, each of which extends axially from body 13. The spring units 12 are interconnected by connecting fins 14, which extend from the body 13 of each spring unit 12. It should be understood that, in the blow molded embodiment, the fins 14 extend from the spring units 12 only within a region "A", as shown in FIG. 1, which is likewise the height of the body 13 of each spring, although other configurations may be used under the present invention. In this embodiment, the fins do not extend the length of the spring units, and therefore it may be seen that top and bottom deformable ends 15T, 15B, respectively, of the springs units are free to be axially compressed along the longitudinal axes X of the spring units 12. For example, in referring to FIG. 1, the right hand most spring unit 12' has each deformable end free to be compressed along axis X'.

It may be seen that each deformable end of each spring member 12 includes a deflectable portion having a "bellows"-type side wall configuration, which allows the springs to be axially compressed when encountering a given force, but yet to expand when such force is removed. However, it should be understood that other deformable configurations may be used which fall under the spirit and scope of the present invention. The side walls of the end members may be referred to as "creased", "plaited" or "bellowed".

Referring to FIG. 3, it may be seen that the particular configuration of the spring row or array 10 allows for the top and bottom ends 15T, 15B, respectively of each spring unit to include a large, substantially circular supporting surface 16T, 16B, respectively, each having a circular area of approximate diameter d. This area may only be diminished by an orifice such as a small pin hole which may be left behind under one blow molding process discussed later in this application. The supporting surfaces 16 provided by the particular unique configuration of spring array 10 are a particular advantage of the present invention. It should be understood that this advantage is significant in comparison to prior art pocketed- or unpocketed-spring configurations. In such prior art configurations, the contact surface between the coils and the exterior material which they bear upon (for example, quilting, foam layers, etc.) is only in the shape of a circular "ring" as the very nature of the wire springs prevents their ends from providing a larger, more uniform bearing surface. This is to be contrasted by the larger supporting surface provided by the present invention.

Finally, it should be understood that spring arrays such as 10 may be attached to other similarly-configured arrays such as 110 shown in phantom in FIG. 3, such that an innerspring construction including a plurality of arrays may be provided for use within mattresses, cushions, or box springs. The mode of connection may be by hot-melt glue at points 112, or by other means known in the art. Examples of assembling such innerspring constructions are shown in my U.S. Pat. Nos. 4,578,834 and 4,566,926.

Blow Molding Method

A preferred blow molding process used to provide the spring configuration shown in FIGS. 1 and 3 is now discussed. A length of extruded tubing 17 is provided by means known in the art. The tubing 17 may be of various thermoplastic polymeric materials, such as polyvinyl chloride, polyethylene, or polypropylene.

A mold is used which, when closed, defines a plurality of spacedapart interior voids. The tubing, heated or otherwise processed to a moldable state, is placed within two cooperating halves of the mold (not shown) such that the tubing is substantially sealed along spaced-apart seams which divide the tubing into various pockets or cavities, which will later be blown into the voids of the mold to the desired spring configuration. Hollow needles (not shown), corresponding to the amount of desired springs, are inserted into the interior of each pocket in a manner known in the art, preferably at points which will later be the sides, and not the ends, of the springs. Air is then "blown" through the needles into the pockets, such that the air forces the tubing to expand to fill the voids defined by the mold. The resulting blow molded spring array is then withdrawn from the mold when it may safely be handled, and then allowed to cure or cool as known in the art. Residual "flash" material which may be present at locations 28 may be removed manually by the use of knives, may be removed by die-cutting, or, may be left intact if desired.

Alternate Blow Molded Embodiments and Blow Molding Methods

It should be understood that various alternate methods of constructing the item shown in FIGS. 1 and 3 may be practiced under the scope of the present invention, which may result in alternate embodiments. For example, the needles may be inserted at what will later be the tops or bottoms or the springs (or both). Alternately, the mold may be configured such that the air may be blown into various spaced-apart pockets, and the air may be allowed to pass from one pocket to another through a small orifice (not shown) along and inside the fins connecting the pockets. However, it should be understood that the use of such an orifice should be monitored closely in that it could unduly restrict (although not completely) the flow of air between the pockets.

As discussed above, holes 18 or similar orifices may be left behind due to the insertion of the needles. If desired, the size of the hole can be selected as desired depending on the desired dynamic cushioning properties of the springs. The holes may be configured such that they restrict the flow of air flowing through them, such that air may be "squeezed" at a desired rate out of the holes during compression of the springs. It may be understood that the air within the springs, being under pressure under such dynamic conditions, will have an effect on the dynamic load response of the spring, as the spring will resist compression due to the resistance to deformation of the spring material, and also due to higher air pressure of the air trapped therein. It should be understood that the dynamic response (deflection under variable loading) of springs having holes will be most affected by changes in hole size, as compared to the static response (deflection under static loading), which will vary little for springs differing only in hole size, as under truly static conditions the air pressure within the springs will be equal to the air pressure outside the springs. It should also be understood that more than one or more holes could also be provided by piercing the springs after they have cooled.

The advantages of providing orifices which effect the dynamic response of the springs is readily apparent. For example, it may be desired to provide relatively small orifices, which would tend to allow the air to bleed out of the springs relatively slowly. If the spring was used in a mattress configuration, the resulting mattress configuration would have a relatively stiff dynamic response (which could be advantageous should the mattress encounter a suddenly high load such as a foot or elbow). However, as previously discussed, when the mattress is under a relatively static condition (such as during sleep), the springs could be configured to closely follow the contour of a person's body, giving the feel of a softer mattress.

It is not necessary that any holes left behind by the needles be sealed, such that the spring arrays are airtight. Such an airtight design would allow the springs to resist compression not only by virtue of the resistance of the spring material to deform, but also due to the resistance of compression of the air trapped therein.

Finally, it may also be understood that it could be possible to make a mattress-box spring combination with the use only of blow molded springs, with "vented" springs (those having holes or similar orifices) being used for the mattress inner assembly (providing the desired independent spring action), and unvented (sealed), firmer springs being used in the box spring inner assembly. Such varied use of a particular item would provide for a cost savings in mattress-box springs construction, especially if the springs are being fabricated on-site.

Slotted Extrusions

Figure 4:
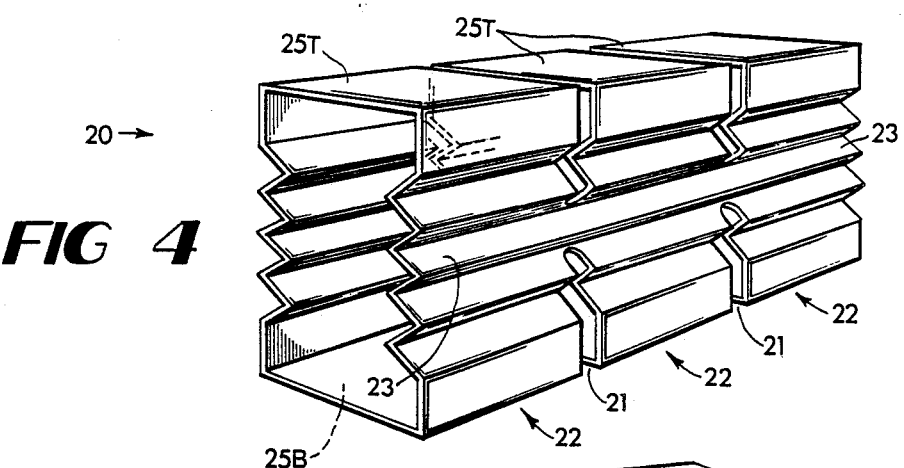
FIG. 4 is a perspective view of a second embodiment of a spring array cut from extruded polymeric material according to the present invention.

Referring now to FIG. 4, a second embodiment of the invention, a slotted extrusion member 20, is shown, which has particular advantages for use in a box spring construction. Slotted extrusion member 20 is slotted at various locations 21, resulting in that the slotted extrusion member 20 may be considered a plurality of individual spring sections 22, each connected to the other at bodies 23. Each spring section 22 includes a body 23, and also includes opposing top and bottom deformable ends 24T, 24B, respectively.

It should be understood that the body 23 of each spring section 22 is connected to an adjacent spring section by suitable connecting means (in the preferred extruded embodiment the "connecting means" and "bodies" are provided by the side walls of the extrusion member) and the slots 21 do not extend into the bodies 23. It should also be understood that the top and bottom deformable end members 24T, 24B, are separated from corresponding adjacently-positioned deformable ends by the slots 21.

The independent action of the spring sections 22 of slotted extrusion 20 is similar although not identical in operation to the blow molded spring units 12 of blow molded spring array 10, previously discussed, except that the altered dynamic response provided by the previously-discussed orifices is not present.

The top and bottom deformable end members 24T, 24B, each define top and bottom supporting surfaces 25T, 25B, respectively. In the embodiment shown in FIG. 4, it may be seen that these supporting surfaces are planar and rectangular in area although other configurations are contemplated under the present invention. Again, the advantages of such planer support surfaces are apparent over previously-discussed prior art spring units which only provide support services which are substantially "ring"-like in configuration.

Figure 5:
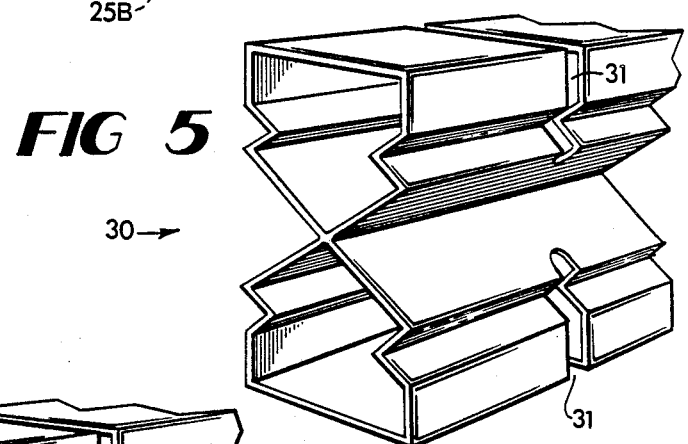
FIG. 5 is a view similar to FIG. 4 of a spring array cut from extruded polymeric material according to the present invention, except that a third embodiment is shown having a varied transverse cross section.
Figure 6:
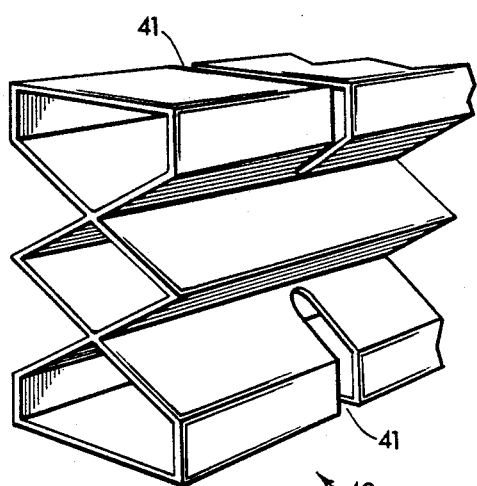
FIG. 6 is a view similar to FIG. 4 of a spring array cut from extruded polymeric material according to the present invention, except that a fourth embodiment is shown having a varied transverse cross section.
Figure 7:
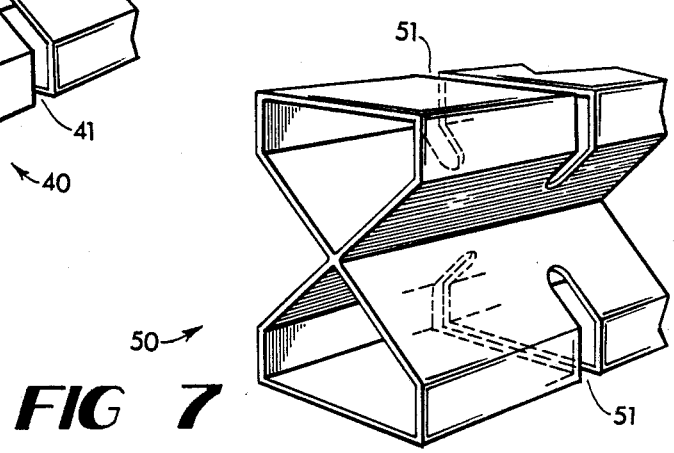
FIG. 7 is a view similar to FIG. 4 of a spring array cut from extruded polymeric material according to the present invention, except that a fifth embodiment is shown having a varied transverse cross section.

Referring now to FIGS. 5, 6 and 7, it may be seen that other embodiments 30, 40, 50 are contemplated under the present invention, having corresponding slots 31, 41, 51. The embodiment shown in Figures 5, 6 and 7 are all fabricated in the same general manner as embodiment 20 shown in FIG. 4; an extrusion is provided which is later slotted as and if desired.

The process of providing the slotted extrusions 20 shown in Figure 4 is as follows. A continuous "tube" of material having a substantially constant cross-section is extruded in a manner known in the art, this tube having ribbed and deformable side walls and a substantially planar top wall and bottom wall. After the extruded material has stabilized to a desired state, the slots 21 are provided at the desired positions. The slots may be sawed in a manner known in the art, or, if the extruded material is of a polymeric thermoplastic composition, hot wires may be used to melt slots 21 as desired. Other methods of slotting known in the art may also be used without departing from the spirit and scope of the present invention.

It should be understood that the extent to which a particular extrusion is slotted at 21 will determine the deflectability per force unit of the resulting spring sections 22. For example, an extrusion which is slotted almost to its center (thus having a relatively small body) will be more deformable per unit of force than a similarly-configured extrusion which is slotted less deeply. Therefore, it should be understood that the desired "firmness" of a mattress, cushion or box spring may be varied for a given extrusion, depending upon the after-extrusion slotting procedure used. This is an important feature of the invention, as cost savings may be realized by the use of only one type of extrusion. This may compare to the difficulties in varying prior art "spring" designs, in which the firmness must be varied by varying the configurations of the coil springs during their fabrication. The extruded configurations shown as 20, 30, 40, and 50 also may also be slotted and used in mattresses, cushions, or box springs.

It should be understood that the extruded channels could be slotted from only one end, such as from the top end or the bottom end. In such a configuration, it should be understood that the independent action of the springs would not exist on the unslotted side, but only on the side which is slotted.

Finally, it should be understood that the extruded channels could be used without slotting. Such configurations, although not having the independent spring properties inherent in the slotted configurations discussed above, are particularly suited for box spring applications, as they are relatively stiff. The absence of slotting also allows for a cost savings. It may also be understood that it could be possible to make a mattress-box spring combination with the use only of extruded members, with slotted extruded members being used for the mattress inner assembly, and unslotted members being used in the box spring inner assembly, the cost saving is again apparent, as only one type of extruded member may be used in fabricating mattresses and box springs.

In light of the above, it may be understood that the present invention overcomes disadvantages in the prior art by providing a blow-molded configuration which may be used in a mattress, cushion, or box spring construction, and is effective in performance, yet cost-effective in that it requires a minimum of materials and labor. Furthermore, the blow-molded embodiment does not include outwardly-protruding fabric seams, as no fabric is required. The extruded embodiment of the invention has similar advantages and is extremely easy to fabricate. All configurations provide improved end supporting surfaces which are greater in area than prior art configurations, thus decreasing load concentration between the springs and the surfaces they bear upon, correspondingly reducing the tendency of failure at that point of contact.

It should be understood that the foregoing relates only to a preferred embodiment of the present invention, and that numerous modifications or alterations may be made therein without departing from the spirit and scope of the invention as set forth in the appended claims.

What is claimed is:

1. A load supporting structure, comprising:
   (A) a first spring member itself of unitary blow molded construction, said first spring member comprising:
      (1) a substantially tubular first body portion having a first longitudinal axis, and
      (2) two opposing end portions, said end portions each defining a substantially planar supporting surface being deflectable relative to said first body portion along said first axis;
   (B) a second spring member itself of unitary blow molded construction comprising:
      (1) a second body portion having a second longitudinal axis, and
      (2) two opposing end portions, said end portions each defining a substantially planar supporting surface being deflectable relative to said second body portion along a second axis; and
   (C) means for interconnecting said first spring member and said second spring member such that said first axis is substantially parallel to said second axis, and wherein said end portions of said first spring member are spaced apart and independently deflectable relative to said end portions of said second spring member.

2. The load supporting assembly as claimed in claim 1, wherein each of said end portions includes a deformable portion.

3. The load supporting assembly as claimed in claim 2, wherein each of said deformable portions is of a bellowed construction.

4. The load supporting assembly as claimed in claim 3, wherein said first and second spring members are of common unitary construction.

5. The load supporting assembly as claimed in claim 4, wherein each of said supporting surfaces is of substantially circular configuration.

6. The load supporting assembly as claimed in claim 2, wherein said first and second spring members are of common unitary construction.

7. The load supporting assembly as claimed in claim 1, wherein said first and second spring members are of common unitary construction.

* * * * *